Aug. 13, 1946.        M. N. YARDENY        2,405,628
CONTROL DEVICE
Filed Aug. 23, 1943        2 Sheets-Sheet 1
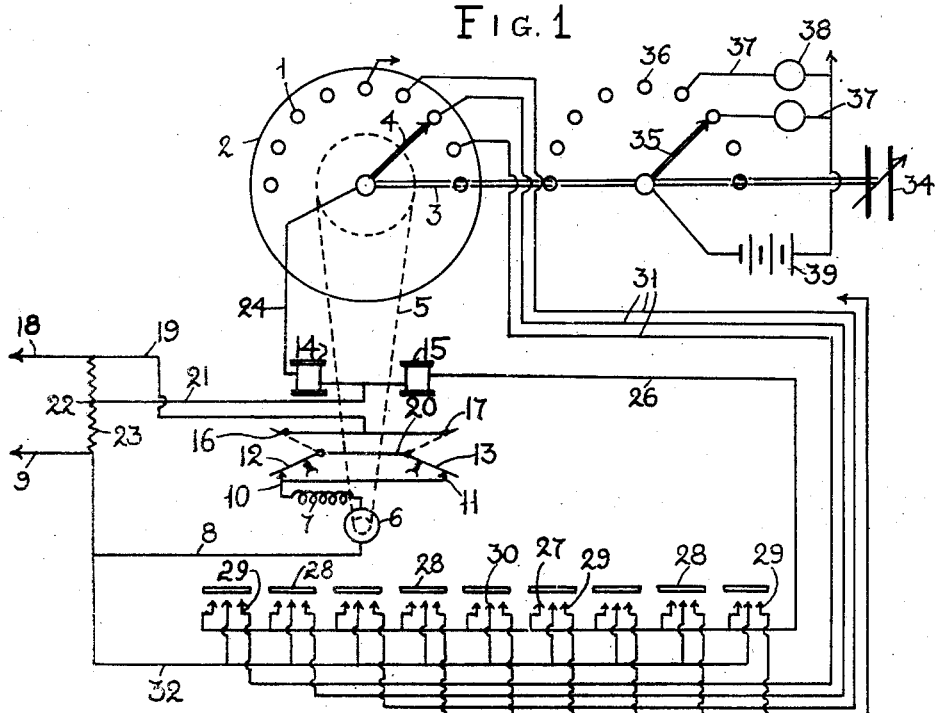
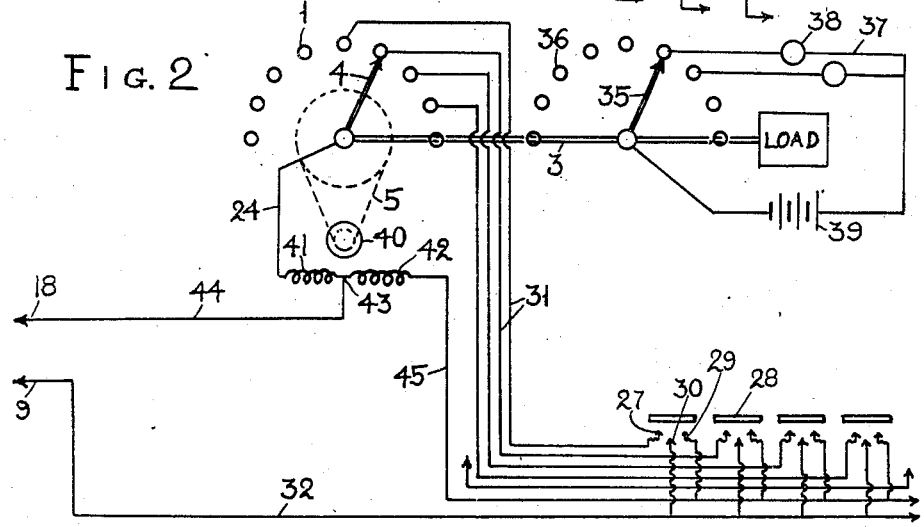
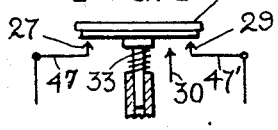 
*Michel N. Yardeny*
INVENTOR
BY *John P. Nikonow*
ATTORNEY

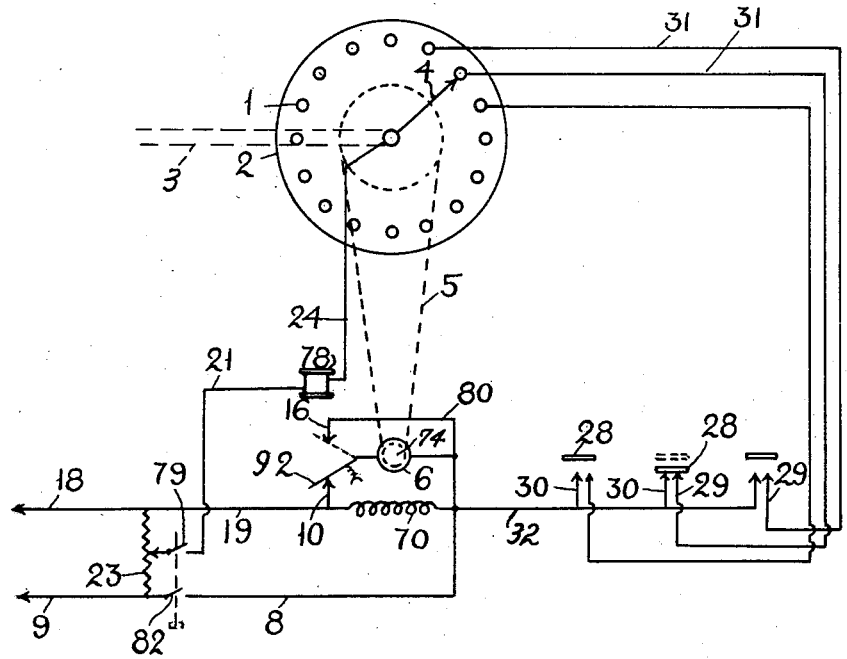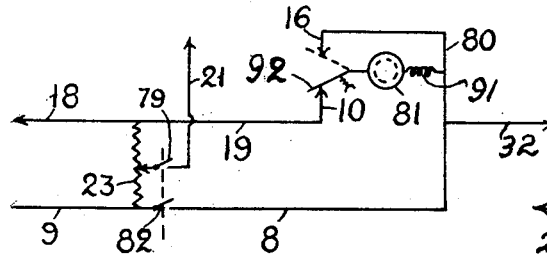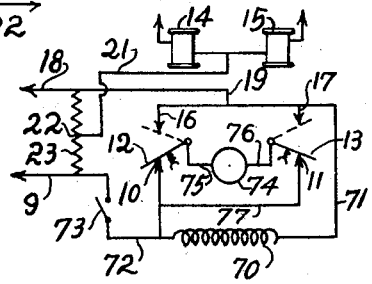

Patented Aug. 13, 1946

2,405,628

UNITED STATES PATENT OFFICE 2,405,628

CONTROL DEVICE

Michel N. Yardeny, New York, N. Y.

Application August 23, 1943, Serial No. 499,635

5 Claims. (Cl. 172—239)

This invention relates to electrical control apparatus for placing a useful load in one of several predetermined positions, particularly to electrical control apparatus in which the useful load is moved by a drive means and a plurality of selectively operable switch means are provided for controlling starting of the drive means and stopping same in a predetermined position as selected by operation of one of the switch means.

One of the objects of the invention is the provision of means for starting the drive means and stopping the same accurately and definitely in the selected predetermined position.

Another object of the invention is the provision of switch means for preventing an accidental or unintentional momentary restarting of the drive means after it has reached its stopping position and when and while the selected switch means is released.

Another object of the invention is the provision of means for starting movement of the drive means always in the same direction in response to the operation of a selected switch means.

My device is suitable for various applications including tuning of radio apparatus, particularly for successively tuning the radio apparatus to various predetermined frequencies, for operating a frequency band switch, etc., also for other applications in which a certain useful load must be placed in one of several predetermined positions.

My invention is more fully described in the accompanying specification and drawings in which—

Fig. 1 is a diagrammatic view of my control apparatus for placing a useful load in one of several predetermined positions;

Fig. 2 is a similar view of a modified system;

Figs. 3 and 4 are detail views of a control switch for the control apparatus according to the invention.

Fig. 5 is a diagram of a modified connection for the motor shown in Fig. 1 in which a modification dynamic braking is employed; and Figs. 6 and 7 are diagrammatic views of modified systems using dynamic braking of the motor.

My remote control system as shown in Fig. 1 consists of a number of contact points 1 mounted in spaced relation to each other preferably on a common insulation base or disc 2. The contact points are preferably arranged in a circle concentric with a shaft 3 on which a contact arm 4 is mounted, sliding over the contact points. The shaft 3 is connected by a suitable transmission 5 with an electric motor 6. The latter may be of any suitable type, for direct or alternating current, shunt, series or universal, squirrel cage, etc. For the purpose of illustration a series wound motor is shown in which the armature is connected in series with a field winding 7. The winding at one end is connected by a lead 8 with the terminal 9 of a source of current through the armature if the motor is series connected, or directly if some other type of motor is used, the other end of the winding being connected with contact points 10, 11. The latter are normally engaged by contact arms 12, 13 of a relay having magnet coils 14, 15. The coils, when energized, attract the arms 12, 13 in this particular example against tension of retrieving springs into engagement with contact points 16, 17, connected to the terminal 18 of the source of current by a lead 19. The arms 12, 13 are connected together by a lead 20. The common tap of the coils 14, 15 is connected by a lead 21 to the terminal 22 of a suitable source of current, such as potentiometer 23 connected across the terminals 9, 18 of the source of the current. (The potentiometer may be omitted however.) The free end of the coil 14 is connected by a lead 24 to the contact arm 4. The end of the coil 15 is connected by a lead 26 to contact points 27 of push button switches 28. Each switch 28 has three contact points, indicated by numerals 29 and 30 in addition to the points 27. The points 29 are connected by leads 31 to the corresponding contact points 1. The points 30 are connected by a lead 32 with the terminal 9 of the source of current.

Normally the relay coils 14, 15 are de-energized, the circuit being interrupted at the switches 28 by means of retrieving springs 33 (Figs. 3 and 4) which urge the switch buttons 28 upward, out of contact with the points 27, 29 and 30. Since both arms 12, 13 normally engage the points 10, 11, they disconnect the motor from the circuit.

The operation of the device is started by depressing one of the switch buttons 28 thereby connecting together the corresponding points 27, 29, and 30. As a result, a circuit will be closed for the relay coil 15 across the terminals 9, 22 through lead 32, points 30, 27, and leads 26, 21. Coil 15 will attract the arm 13, bringing it in contact with the point 17. A circuit will now be closed for the motor through connector 8 from the terminal 9, point 10, arm 12, connector 20, arm 13, point 17, and lead 19 to the terminal 18. The motor will rotate, causing rotation of the contact arm 4. The circuit for the other relay coil 14 will remain disconnected, however, until the arm 4 reaches the contact 1 which is connected by the corresponding lead 31 with the corresponding point 29 of the selected switch 28. When this contact is established the coil 14 will be also energized, its circuit being closed from the terminal 22 of the potentiometer 23 through leads 21, 24, arm 4, engaged point 1, lead 31, contact points 27, 30, and lead 32. The arm 12 will be raised into engagement with the point 16 thereby disconnecting the motor from the circuit. To expedite stopping of the motor an automatic brake on any other mechanical brake of an ordinary construction may be employed.

The relay coils 14, 15 will be deenergized when the selected switch button is released. Both arms 12, 13 will be then moved downward against the contact points 10, 11, disconnecting the motor from the circuit until another switch button is depressed.

The shaft 3 can be connected to a useful load such as variable condenser 34. The shaft 3 can be also connected to a contact arm 35 successively engaging contact points 36 for closing individual circuits 37, 37' for operating motors 38 or other electrical devices from an independent source of current 39, such as band switches in radio devices. Rotary or snap switches can be also used with provision for automatically disconnecting all other switches when a selected switch is closed.

A modified system is shown diagrammatically in Fig. 2. The contact arm 4 is connected by the transmission 5 with an induction motor 40 having reversing windings 41 and 42. The windings are connected together at a common tap 43 connected by a lead 44 with the terminal 18 of the source of current, the other terminal 9 being connected by lead 32 with contact points 30 of switches 28. The winding 42 is connected by a lead 45 with the contact points 29 of the switches 28. This winding will be therefore energized whenever one of the switches 28 is closed thereby causing the motor 40 to rotate, advancing the arm 4. As soon as the arm 4 engages the contact point 1 connected with the contact point 27 of the selected depressed switch 28, the other field winding 41 will be also energized, causing the motor to be stopped by the opposing electromotive forces if the motor is single phase A. C., or, if it is series wound D. C., or other type with opposed field windings, it will be stopped by the field being demagnetized.

The switch contact points 27, 29 as shown in Figs. 3, 4 are mounted on a level above the contact points 30 on resilient arms 47, 47' so that the point 30, leading to the source of current will be disconnected first, thereby making it impossible for the motor to have one winding disconnected prior to the other, in which case the motor would receive a rotative impulse, changing the position of the arm 4.

Fig. 5 shows a circuit diagram in which the motor is connected to be stopped by dynamic braking. According to Fig. 5 which should be examined together with Fig. 1 the field winding 70 of a motor 74 is connected to the terminals 18, 9 by leads 19, 71 and 72 with a switch 73. The armature of the motor 74 is connected by leads 75, 76 with the contact arms 12, 13, operated by the relay coils 14, 15. The field winding 70 remains energized all the time. The armature is normally short circuited by the arms 12, 13 and a lead 77, but when relay 14 is energized by depressing one of the push button switches 28, relay arm 12 will be raised, permitting the current to flow through the armature, causing the motor to rotate in a corresponding direction.

When both coils 14, 15 are energized after arm 4 engages one of the points 1, both arms 12, 13 will be raised, short circuiting the armature through the lead 71 and stopping the motor by dynamic braking.

The principle of dynamic braking can be used with various direct current or universal motors, with or without relays. The diagram of Fig. 5 is also applicable to a case where the motor has permanent magnets for its field, the shunt winding 70 and lead 71 being then omitted.

Another modification is shown in Fig. 6 in which the armature circuit of motor 74 is controlled by a single relay coil 78 controlling an arm 92. The shunt field winding 70 of the motor is energized as soon as coupled switches 79, 82 are closed. The armature will be then also energized, the arm 92 being held on the point 10 by a spring. Relay 78 will be de-energized, but the motor will rotate (always in the same direction) until the arm 4 engages a contact 1, connected by a lead 31, with the contact point 29 of a pair of contact points 29, 30, connected by depressing the selected switch or push button 28. Relay 78 will be then energized, contact 79 being closed and attract the arm 92 against point 16 and short circuiting the armature through a lead 80. The motor will be then stopped by dynamic braking, the field being still energized. The shaft 3 is thus placed in its predetermined position.

In the modification of Fig. 7 which should be examined together with Fig. 6 a series wound motor 81 is used with a series winding 91. Its operation is the same as in the case of Fig. 6 but the motor armature will be short circuited through the field winding 91 when the relay 78 is energized. The dynamic braking effect will be produced by the current, generated by the armature and passing through the field winding.

It should be noted that the potentiometer is not necessary for the operation of the systems according to the invention and may be dispensed with, the relays being then connected directly to the line or to a transformer.

The push buttons used are preferably of a type in which a button, once depressed, remains in a closed position and is released automatically only when another button is depressed, or when all the buttons are released by a special release button. With such an arrangement the motor remains short circuited, preventing its accidental movement.

I claim as my invention:

1. An electrical control apparatus comprising a plurality of contact elements mounted in spaced relation to each other; a contact member arranged for a relatively movable engagement with the contact elements; a drive means including a motor to effect relative movement between the contact elements and the contact member; a circuit means for causing rotation of the motor always in a predetermined direction; a plurality of switch elements, each of said switch elements comprising three contact points, one of said contact points being adapted to be connected with a source of current, the second contact point being connected with said circuit means, and the third contact point being connected in a circuit with a corresponding contact element; means for interconnecting the three contact points of a selected switch element thereby connecting the circuit means with the source of current for causing rotation of the motor; and means for causing the motor to be stopped in response to the contact member being in engagement with the contact element connected to the third contact point of the selected switch element, the first contact point of each switch element being constructed and arranged to be disconnected not later than the other two contact points when the selected switch element is released.

2. An electrical control apparatus comprising a plurality of contact elements mounted in spaced relation to each other; a contact member arranged for a relatively movable engagement with the contact elements; a drive means including a motor to effect relative movement between the contact elements and the contact member; a circuit means for causing rotation of the motor always in a predetermined direction; a plurality of switch elements, each of said switch elements comprising three contact points, one of said contact points being adapted to be connected with a source of current, the second contact point being connected with said circuit means, and the third contact point being connected in a separate circuit with a corresponding contact element; means associated with and operable by each switch element for interconnecting the three contact points of a selected switch element, thereby connecting the circuit means with the source of current for causing rotation of the motor, the second and third contact points of each switch element being yieldably supported at a shorter distance than the first contact point from the means for interconnecting the three contact points, thereby connecting all three contact points by depressing the second and the third contact points prior to engaging the first contact point when a selected switch element is operated and disconnecting the first contact point prior to the second and third contact points when the selected switch element is released; and means for causing the motor to be stopped in response to the contact member being in engagement with the contact element connected to the third contact point of the selected switch element.

3. An electrical control apparatus comprising a rotatably supported contact arm, a plurality of stationary contact elements mounted in spaced relation to each other concentrically with the axis of rotation of the contact arm and arranged to be successively engaged by the contact arm; a plurality of switch elements, each of said switch elements comprising three contact points, one of said contact points being adapted to be connected with a source of current, the second contact point being connected with said circuit means, and the third contact point being connected in a circuit with a corresponding contact element; means for interconnecting the three contact points of a selected switch element, thereby connecting the circuit means with the source of current for causing rotation of the motor; and means for causing the motor to be stopped in response to the contact member being in engagement with the contact element connected to the third contact point of the selected switch element, the first contact point of each switch element being constructed and arranged to be disconnected not later than the other two contact points when the selected switch element is released.

4. An electrical control apparatus comprising a plurality of contact elements mounted in spaced relation to each other; a contact member arranged for a relatively movable engagement with the contact elements; a drive means including a motor to effect relative movement between the contact elements and the contact member; a circuit means for causing rotation of the motor always in the same direction; a plurality of switch elements, each of said switch elements comprising three contact points, one of said contact points being adapted to be connected with a source of current, the second contact point being connected with said circuit means, and the third contact point being connected in a circuit with a corresponding contact element; means for interconnecting the three contact points of a selected switch element, thereby connecting the circuit means with the source of current for causing rotation of the motor, and relay means arranged to be energized and to stop the motor when energized, in response to the contact member being in engagement with the contact element connected to the third contact point of the selected switch element, the first contact point of each switch element being constructed and arranged to be disconnected not later than the other two contact points when the selected switch element is released.

5. An electrical control apparatus comprising a plurality of contact elements mounted in spaced relation to each other; a contact member arranged for a relatively movable engagement with the contact elements; a drive means including a motor to effect relative movement between the contact elements and the contact member; a circuit means for causing rotation of the motor always in the same direction; a relay means for controlling said circuit means for the purposes aforesaid; a plurality of switch elements, each of said switch elements comprising three contact points, one of said contact points being adapted to be connected with a source of current, the second contact point being connected with said circuit means, and the third contact point being connected in a circuit with a corresponding contact element; means for interconnecting the three contact points of a selected switch element, thereby connecting the circuit means with the source of current for causing rotation of the motor; and a second relay means arranged to be energized and to stop the motor when energized, in response to the contact member being in engagement with the contact element connected to the third contact point of the selected switch element, the first contact point of each switch element being constructed and arranged to be disconnected not later than the other two contact points when the selected switch element is released.

MICHEL N. YARDENY.